J. D. WATT.
SAWING MACHINE.
APPLICATION FILED DEC. 8, 1913. RENEWED OCT. 22, 1914.

1,123,442.  Patented Jan. 5, 1915.

WITNESSES:

INVENTOR
James D. Watt
BY
James T. Watson
ATTORNEY

UNITED STATES PATENT OFFICE.

JAMES D. WATT, OF DULUTH, MINNESOTA.

SAWING-MACHINE.

1,123,442. Specification of Letters Patent. Patented Jan. 5, 1915.

Application filed December 8, 1913, Serial No. 805,223. Renewed October 22, 1914. Serial No. 868,121.

*To all whom it may concern:*

Be it known that I, JAMES D. WATT, citizen of the United States, residing at Duluth, in the county of St. Louis and State of Minnesota, have invented certain new and useful Improvements in Sawing-Machines; and I do hereby declare the following to be a full, clear, and exact description of the invention, such as will enable others skilled in the art to which it pertains to make and use the same.

My invention relates to sawing machines and has for its object the provision of a simple cheap and durable machine for quickly beveling or miter-sawing the ends of wheel spokes to fit taper holes provided for them in the fellies or hubs of wheels, which machine will be suitable for use particularly in repair shops.

It consists of the constructions, combinations and arrangements of parts hereinafter described and claimed.

Figure 1:
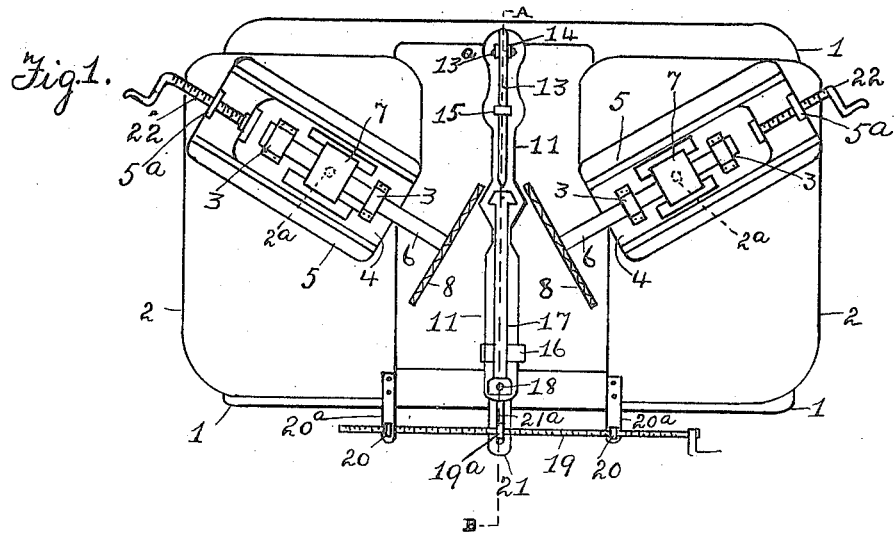
Figure 2:
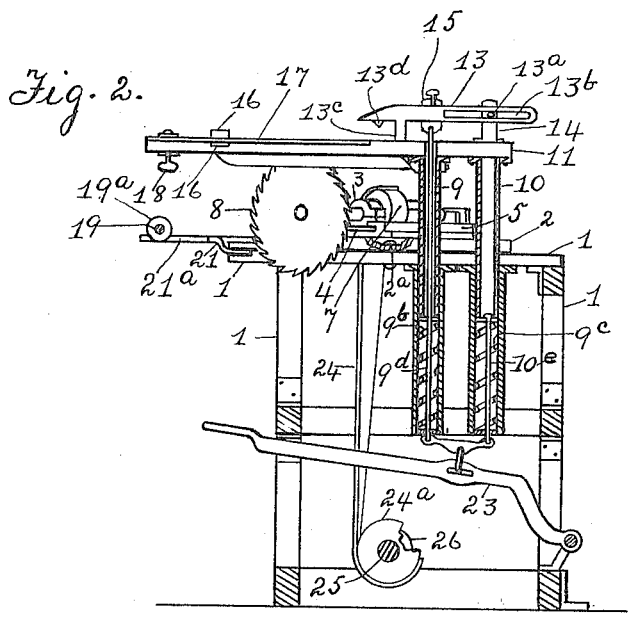
Figure 3:
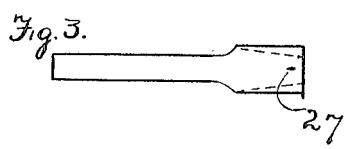

In the drawings, Figure 1, is a top plan view of my said invention. Fig. 2 is a vertical section of the same, on the line A—B of Fig. 1. Fig. 3, is a side elevation of a portion of a wheel spoke showing in broken lines the lines upon which it may be desired to miter saw it by my said invention.

In the drawings, 1 is a relatively fixed table or base of any suitable construction, upon which are pivotally mounted two oppositely positioned tables 2, as by pivots $2^a$, which pivoted tables are spaced horizontally apart. Mounted in suitable bearings, as 3, upon a slidable plate or saw carriage 4 adapted to slide in guides 5 secured to said pivoted tables, respectively, are rotatable shafts 6, upon each of which is keyed a belt wheel 7 and a terminal saw 8, which shafts are positioned oppositely or convergently with respect to each other, and which saws are adapted to depend into the space between said carriages. Extending between said pivoted tables are vertically positioned vertically reciprocable posts 9 and 10, engaged by vertically positioned guides $9^a$ and $10^a$ which are secured to said fixed table. Mounted upon said posts is a forwardly directed spoke arm or table 11, of any suitable construction, normally extending above the plane of said saws and adapted to be drawn downward between said saws by said posts. Upon said spoke arm and preferably parallel with the longitudinal axis thereof is a gage bar, 13, which bar is preferably secured to said spoke arm by means of a bolt $13^a$ extending through a slot $13^b$ formed in said gage bar and through bolt holes formed in the tines of a fork 14 secured to said spoke arm. Said gage bar also preferably passes through an eye in a post 15 erected on said spoke arm. Said gage bar is preferably provided with a depending stop post $13^c$, and with a depending tooth $13^d$ which tooth is adapted to engage a center indent in one face of the spoke to be sawed.

Extending across the spoke arm near its forward end, I preferably provide a gage finger 16 which lies partly in a channel in said spoke arm, and extending longitudinally of said spoke arm and across said finger I preferably provide a flat spring 17 adapted when depressed to bind upon said finger and thus hold it against movement. For depressing said spring 17, I preferably provide a draw screw 18 extending upward through the forward end of said spoke arm and through said spring and provided with a head $18^a$ bearing upon the upper face of said spring. In order to equally and simultaneously swing said pivoted tables upon their pivots, I provide a right and left screw or worm 19 extending near its opposite ends through eyes formed in swiveled posts 20 mounted on said pivoted tables respectively or on brackets $20^a$ extending therefrom. Said screw is provided intermediate of its ends with a collar $19^a$ which depends into a slot $21^a$ formed in a bracket 21 which is secured to said fixed table. In order to slide said saw carriages, I provide screws or worms 22 loosely connected with said saw carriages and engaging threaded lugs $5^a$ erected on said guides 5. Said posts 9 and 10 are preferably raised and supported in raised positions by springs $9^b$ and $9^c$, respectively, of any suitable construction or position, and are preferably retracted or drawn downward by rods $9^d$ and $9^e$ which are attached at their lower ends to a foot lever 23, of any suitable construction. Any suitable driving means may be employed to drive said shafts, respectively, as a belt 24 engaging the belt wheel 7 and a belt pulley $24^a$ mounted on a drive shaft 25 journaled upon said fixed base, to which drive shaft is keyed a drive pulley 26.

In operation, the central longitudinal axis of the spoke to be sawed being first determined as, also, the angles of the cut desired to be made, an indent as 27 is preferably made in the upper face of said spoke in the central longitudinal axis thereof. The pivoted tables are then swung to bring the saws to such predetermined angles and the saw carriages are moved so as to bring the saws to the proper distance from the central vertical plane of said spoke arm. The spoke to be sawed is then laid longitudinally upon said saw arm and said tooth is engaged with said indent, or pressed into the spoke if no indent has been made. The gage finger 16 is then adjusted to bear against one side of the spoke, which is further preferably held manually. Said foot lever is then depressed to draw down said posts 9 and 10 and the parts supported thereon including said spoke, which spoke is thus drawn down upon the revolving saws in such a position as to enable them to make the desired cuts. The foot lever is then released, whereupon the spoke supports rise and the spoke is removed.

Heretofore the miter trimming of spokes in repair shops has usually been done manually involving a large expenditure of time and labor.

While I have described certain details of construction, it is obvious that many of said details may be altered or modified within the scope of my claim.

What I claim is:—

In a sawing machine, the combination with a fixed support of two tables pivotally mounted thereon, said tables being horizontally spaced from each other, means connecting said pivoted tables with each other for simultaneously and equally swinging them on their pivots, a slidable saw carriage mounted on each of said tables, means for moving said carriages toward or away from each other, rotatable shafts mounted on said carriages and extending toward each other, rotatable saws mounted on said shafts and adapted to depend into the space between said carriages, a vertically reciprocatable arm adapted to be raised and lowered between said saws, means for raising and lowering said arm, and means for rotating said shafts.

In testimony whereof, I hereunto affix my signature in presence of two witnesses.

JAMES D. WATT.

Witnesses:
JAMES T. WATSON,
HENRY CLEVELAND.

Copies of this patent may be obtained for five cents each, by addressing the "Commissioner of Patents, Washington, D. C."